United States Patent
Kawamoto

(10) Patent No.: US 8,046,611 B2
(45) Date of Patent: Oct. 25, 2011

(54) INFORMATION TRANSMISSION DEVICE, SYSTEM, AND METHOD

(75) Inventor: Yasutaka Kawamoto, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 539 days.

(21) Appl. No.: 12/230,125

(22) Filed: Aug. 25, 2008

(65) Prior Publication Data
US 2009/0063879 A1 Mar. 5, 2009

(30) Foreign Application Priority Data
Sep. 3, 2007 (JP) ................. 2007-227376

(51) Int. Cl.
*G06F 1/00* (2006.01)
*H04J 1/16* (2006.01)
*H04B 1/38* (2006.01)

(52) U.S. Cl. ........ 713/310; 713/300; 713/320; 455/411; 455/445; 455/574; 370/311; 370/321; 370/330

(58) Field of Classification Search ............ 713/310, 713/320; 370/311; 455/411, 574
See application file for complete search history.

(56) References Cited

U.S. PATENT DOCUMENTS

| 7,174,161 | B2* | 2/2007 | Nakajima et al. | 455/411 |
|---|---|---|---|---|
| 7,298,716 | B2* | 11/2007 | Abraham et al. | 370/321 |
| 7,313,399 | B2* | 12/2007 | Rhee et al. | 455/445 |
| 7,701,858 | B2* | 4/2010 | Werb et al. | 370/241 |
| 7,830,838 | B2* | 11/2010 | Kohvakka et al. | 370/330 |
| 2008/0040509 | A1* | 2/2008 | Werb et al. | 709/242 |

OTHER PUBLICATIONS

"An Energy-Efficient MAC protocol for Wireless Sensor Networks"—Wei Ye, John Heidemann, Deborah Estrin; 10 pages, Dated 2002.*
"Optimizing Sensor Networks in the Energy Latency Density Design Space"—Curt Schurgers, Vlasios Tsiatsis, Saurabh Ganeriwal, Mani Srivastava; 11 pages, Dated Jan. 2002.*
"Medium Access Control With Coordinated Adaptive Sleeping for Wireless Sensor Networks"—Wei Ye, John Heidemann, Deborah Estrin; 14 pages, Dated Jun. 2004.*
"Medium Access Control Issues in Sensor Networks"—Muneeb Ali, Umar Saif, Adam Dunkels, Thiemo Voigt, Kay Romer, Koen Langendoen, Joseph Polastre, Zartash Afzal Uzmi; 4 pages, Dated Apr. 2006.*
Lin, En-Yi A., et al., "Power-Efficient Rendez-vous Schemes for Dense Wireless Sensor Networks"—the proceedings of the IEEE International Conference on Communications,, pp. 3769-3776, 2004.

* cited by examiner

*Primary Examiner* — Brian Misiura
(74) *Attorney, Agent, or Firm* — Rabin & Berdo, P.C.

(57) ABSTRACT

A network includes nodes that transmit information to each other. Some nodes operate intermittently; other nodes operate continuously. Information is transmitted to an intermittently operating node by a handshaking protocol in which the intermittently operating node indicates that it is ready to receive. Information is transmitted to a continuously operating node without such handshaking, thereby saving time and power. Each transmitting node has a memory storing information indicating which other nodes require handshaking.

14 Claims, 6 Drawing Sheets

INFORMATION TRANSMISSION DEVICE, SYSTEM, AND METHOD

BACKGROUND OF THE INVENTION

1. Field of the Invention

The present invention relates to an information transmission device, system, and method in which handshaking is used for power-saving purposes.

2. Description of the Related Art

Sensor networks and other networks that transmit information often include battery-driven nodes that operate only intermittently and power down or 'sleep' when not operating, in order to extend their battery life. Since a node cannot receive transmitted information while asleep, the transmitting node must use some scheme to make sure that the receiving node is ready. One such scheme is the RICER (Receiver Initiated CyclEd Receiver) handshaking scheme proposed by Lin et al. in 'Power-Efficient Rendez-vous Schemes for Dense Wireless Sensor Networks' in the proceedings of the IEEE International Conference on Communications, pp. 3769-3776, 2004, in which a node with information to transmit waits to receive a signal indicating that the destination node is awake before beginning the transmission. The RICER scheme will be further described in the detailed description of the invention.

Actual networks (multi-hop networks, for example) often include both battery-powered nodes, transmission to which requires this type of handshaking, and externally powered nodes, transmission to which does not require such handshaking. A problem with use of the RICER scheme in these networks is that the RICER scheme always employs handshaking. Even in a transmission to a node that is always awake, extra signals must first be transmitted and received to confirm that the node is awake. This consumes extra power and delays the information transmission process.

SUMMARY OF THE INVENTION

An object of the present invention is to provide an information transmitting device, system, and method that can transmit information with handshaking when such handshaking is necessary, and can transmit information without handshaking when handshaking is unnecessary.

The invention provides an information transmitting device for transmitting information to one or more destination devices. The information transmitting device is operable in a plurality of transmission modes, including at least a power-saving transmission mode that includes the transmitting and receiving of power-saving handshaking signals and a normal transmission mode that excludes the transmitting and receiving of the power-saving handshaking signals.

The information transmitting device has a memory for storing information indicating whether or not each destination device requires power-saving handshaking, and a control unit that selects the power-saving transmission mode or the normal transmission mode according to the information stored in the memory.

The destination devices may periodically transmit signals indicating whether or not they require power-saving handshaking. A destination node that requires power-saving handshaking may transmit these signals as power-saving handshaking signals.

The invention also provides a network of nodes, including at least one node that operates as a destination node requiring power-saving handshaking, another node that operates as a destination node not requiring power-saving handshaking, and another node that operates as an information transmitting device as described above.

By avoiding the unnecessary transmission and reception of power-saving handshaking signals, the invention avoids needless transmission delays and saves power, thereby extending the battery life of battery-powered nodes.

DETAILED DESCRIPTION OF THE INVENTION

Figure 1:
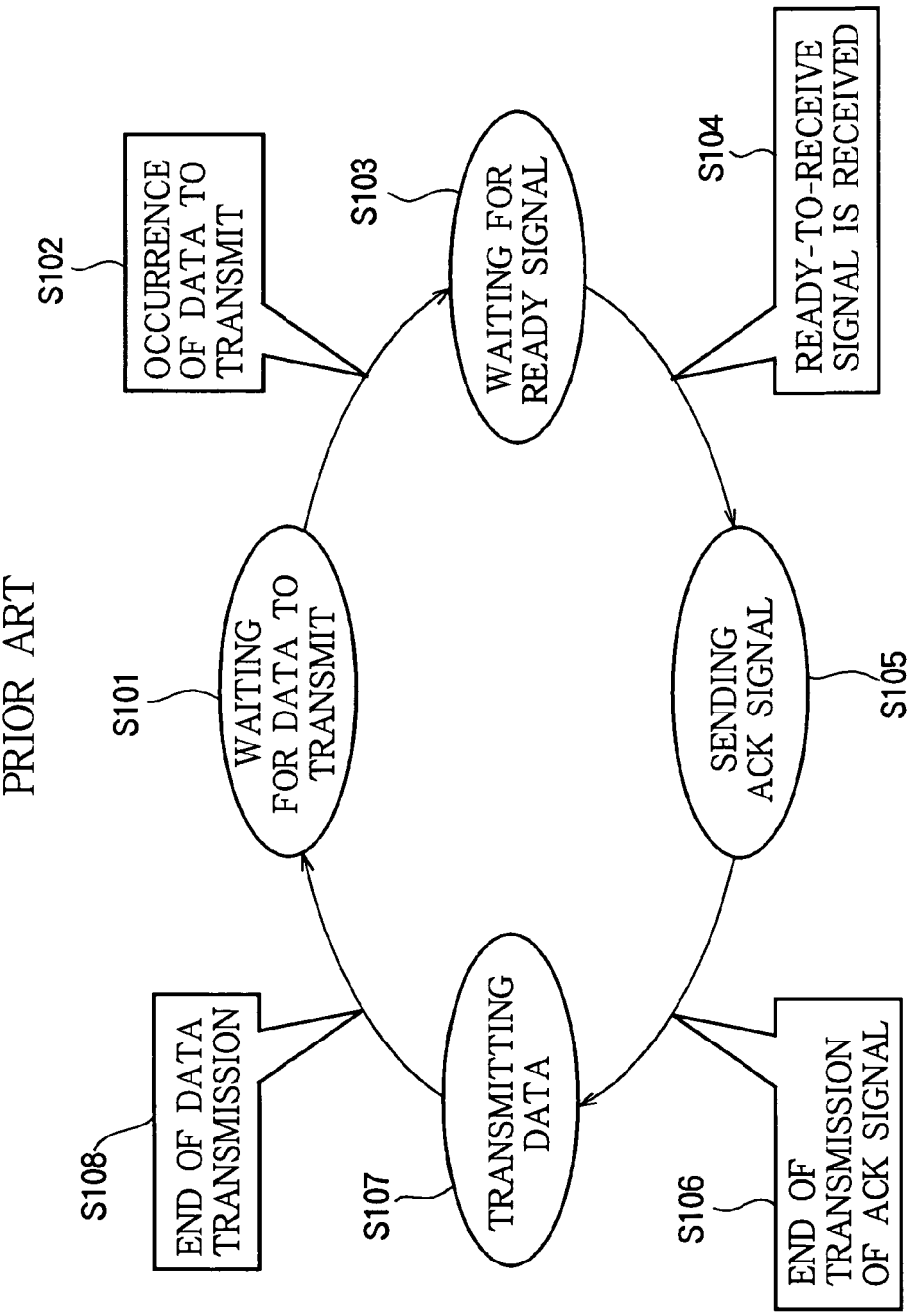
FIG. 1 is a state transition diagram of a conventional transmitting node.

A more detailed description of the conventional RICER scheme and two embodiments of the present invention will now be given with reference to the attached drawings, in which like elements are indicated by like reference characters. For brevity, information will sometimes be referred to as data.

The following descriptions pertain to a communication system such as a multi-hop network with a plurality of information transmitting devices or nodes that transmit information to each other. The network includes at least one power-saving node such as a battery-powered node that operates intermittently and requires power-saving handshaking to receive transmitted information, and at least one non-power-saving node such as an externally powered node that operates continuously and does not require power-saving handshaking in order to receive transmitted information.

Figure 2:
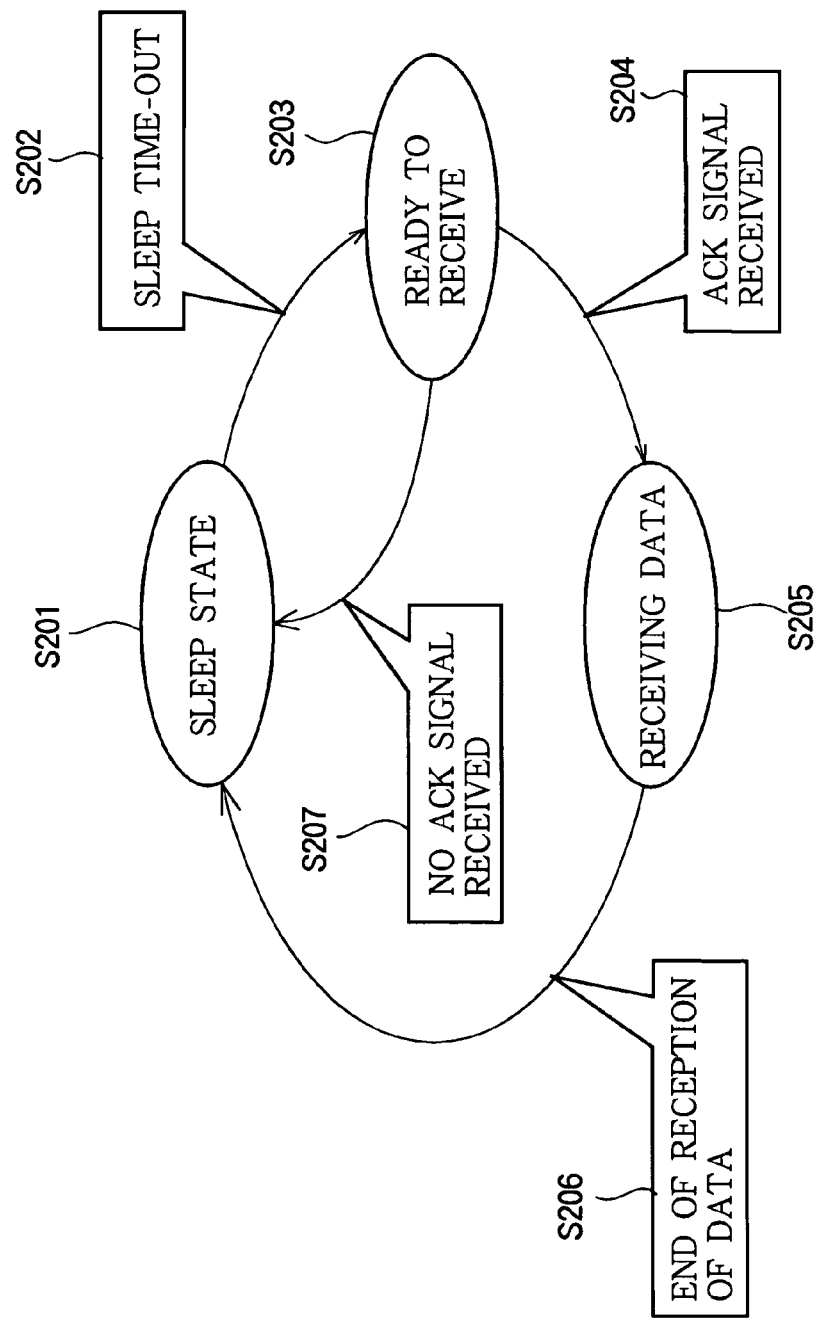
FIG. 2 is a state transition diagram of a conventional receiving node.
Figure 3:
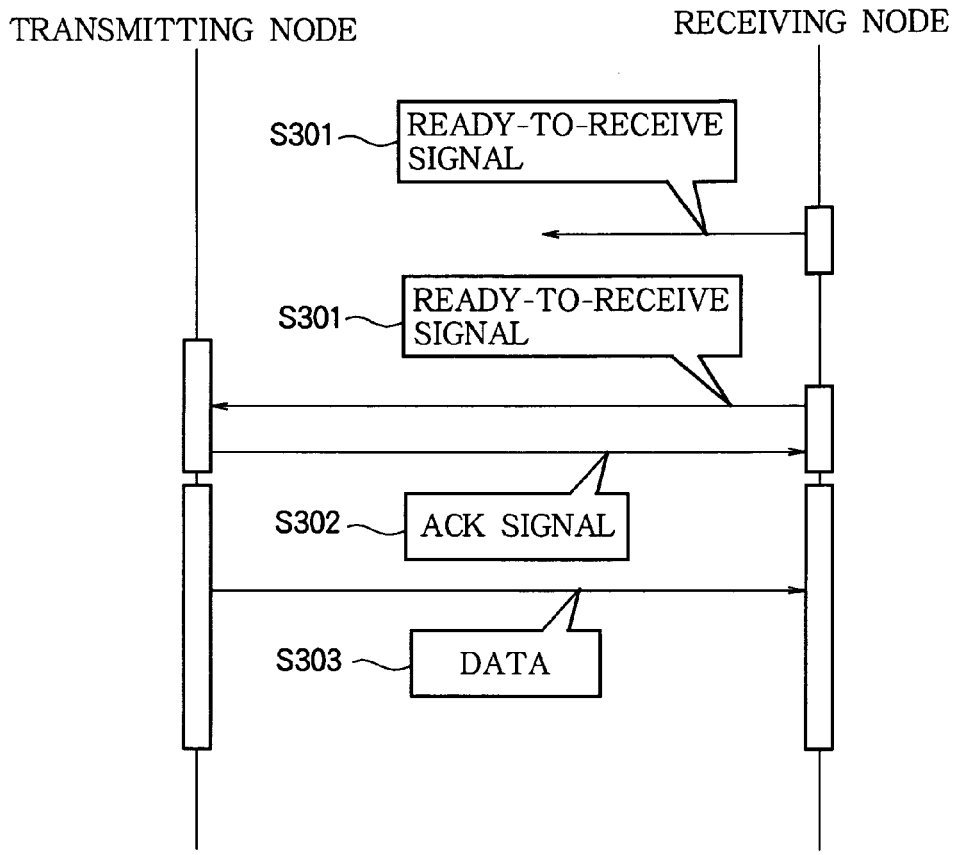
FIG. 3 illustrates a conventional transmission sequence.

According to the conventional RICER scheme, all nodes transmit and receive information according to protocols illustrated by the state transition diagrams in FIGS. 1 and 2 and the communication sequence diagram in FIG. 3.

At the top of FIG. 3, the receiving node is in the sleep state, which is state S201 in FIG. 2. At regular intervals, a timer in the receiving node times out and the receiving node makes a transition S202 to the ready-to-receive state S203.

In the ready-to-receive state S203, the receiving node sends a ready-to-receive signal S301 and waits for a predetermined time to receive an acknowledging signal or ACK signal S302. If an ACK signal S302 is received within the predetermined time, the receiving node makes a transition S204 to the information receiving state S205 and receives information transmitted by the transmitting node. At the end of the information transmission, the receiving node makes a transition S206 back to the sleep state S201.

If no ACK signal S302 is received within the predetermined time in the ready-to-receive state S203, the receiving node makes a transition S207 directly to the sleep state S201.

At the top of FIG. 3, the transmitting node is in an information waiting state, which is state S101 in FIG. 1. The transmitting node has no information or data to transmit to the receiving node, so it does not respond to the ready-to-receive S301 signal transmitted by the receiving node. When an event produces information to transmit, the transmitting node makes a transition S102 to the ready-signal waiting state S103, and waits to receive another ready-to-receive signal from the receiving node. When the next ready-to-receive signal S301 is received, the transmitting node makes a transition S104 to the acknowledging (ACK) signal sending state S105, and acknowledges the ready-to-receive signal by transmitting an acknowledging signal S302 to the receiving node. At the end of transmission of the acknowledging signal, the transmitting node makes a transition S106 to the information transmitting state S107, and transmits information (data) S303 to the receiving node. At the end of the information transmission, the transmitting node makes a transition S108 to the waiting state S101 to await the occurrence of more information to transmit.

If the receiving node is a non-power-saving node, the sleep state S201 in FIG. 2 is eliminated. In the ready-to-receive state S203, a non-power-saving node transmits ready-to-receive signals S301 at regular and frequent intervals. After receiving an acknowledging signal and the following information, the non-power-saving node returns from the information receiving state S205 to the ready-to-receive state S203.

The frequent transmission of ready-to-receive signals by a non-power-saving node wastes power. A more serious problem is that to transmit information to a non-power-saving node, a battery-operated power-saving node must waste time while waiting for a ready-to-receive signal, expend power by remaining awake during this wasted time, then waste further time and power by transmitting an acknowledging signal.

First Embodiment

Figure 4:
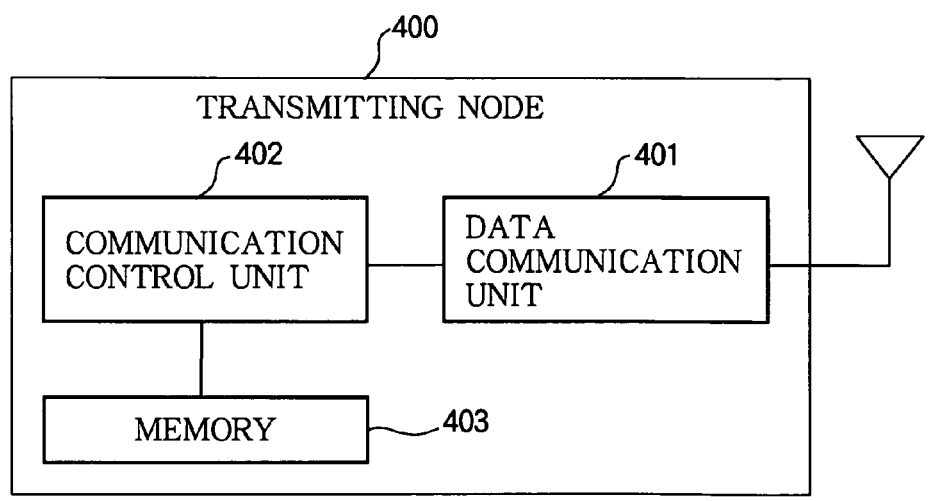
FIG. 4 is a block diagram illustrating a transmitting node in a first embodiment of the invention.

Referring to FIG. 4, the first node embodying the present invention is a transmitting node 400 comprising at least a data communication unit 401, a communication control unit 402, and a memory 403.

The data communication unit 401 performs information communication functions under the control of the communication control unit 402, to which the data communication unit 401 is connected.

The communication control unit 402 is connected to the data communication unit 401 and the memory 403, and controls communication by selecting different communication modes. One selectable mode is a power-saving transmission mode in which transmission starts after reception of a predetermined signal from the destination node. Another selectable mode is a normal transmission mode in which transmission can start at any time. The communication control unit 402 selects the power-saving transmission mode or the normal transmission mode according to information stored in the memory 403.

The memory 403 has prestored information identifying destination nodes for which power-saving transmission control is unnecessary, and provides this information to the communication control unit 402, to which the memory 403 is connected. The information stored in the memory 403 may be input by a user or obtained from a server or other external source, such as another node in the communication system.

Figure 5:
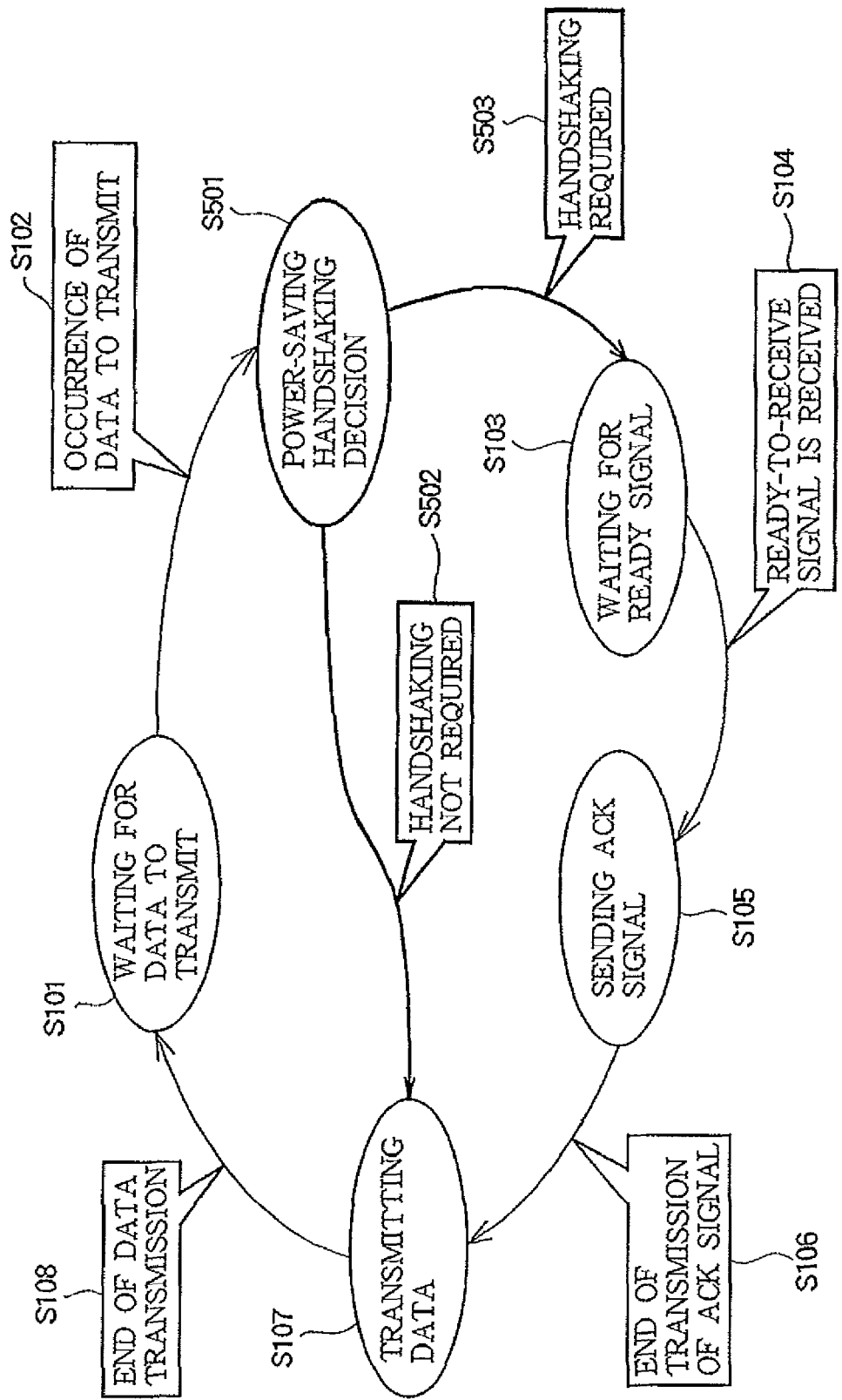
FIG. 5 is a state transition diagram of the transmitting node in FIG. 4.

The operation of the first embodiment will now be described with reference to FIG. 5, which indicates state transitions of the transmitting node in FIG. 4. The description will focus on the differences from the conventional operation shown in FIG. 1.

When an event produces data to transmit to a destination node, the communication control unit 402 of the transmitting node 400 makes a transition (S102) to a decision state (S501) to decide if power-saving handshaking is necessary or not. The decision is based on the information stored in the memory 403.

If there is stored information in the memory 403 identifying the destination node as a node that does not require power-saving handshaking, that is, as a non-power-saving node, the communication control unit 402 selects the normal transmission mode and makes an immediate transition (S502) to the data transmitting state (S107). Transmission of data to a non-power-saving node can therefore be performed without waiting for a ready-to-receive signal.

If there is no information stored in the memory 403 identifying the destination node as a non-power-saving node, the communication control unit 402 selects the power-saving transmission mode and makes a transition (S503) to the ready-signal waiting state (S103). When a ready-to-receive signal is received (S104), an acknowledging (ACK) signal is transmitted (S105). After completion of the transmission of the acknowledging signal (S106), the data are transmitted (S107). Communication with a power-saving node is thus performed with power-saving handshaking as in the prior art.

As described above, in the first embodiment, the transmitting node uses the power-saving mode and normal mode selectively, based on stored information identifying non-power-saving nodes. Communication with a non-power-saving node can therefore take place without unnecessary handshaking. This has the following advantages.

First, when the receiving node is a non-power-saving node, the transmitting node can transmit data with less expenditure of power, because it does not have to transmit and receive handshaking signals.

Second, when the receiving node is a non-power-saving node, the transmitting node can transmit data without waiting for a ready-to-receive signal, resulting in less transmission delay.

Although the first embodiment is based on a receiver-initiated system in which power-saving handshaking is initiated by the destination node (by transmission of the ready-to-receive signal), the invention is also applicable in systems in which power-saving handshaking is initiated by the transmitting node, as in the TICER (Transmitter Initiated CyclEd Receiver) scheme described by Lin et al. The transmitting node stores information identifying nodes that do not require power-saving handshaking, and skips the power-saving handshaking procedure in transmissions to these nodes. The same two advantages are obtained.

The communication modes are not limited to a single power-saving transmission mode and a single normal transmission mode. There may be more modes. For example, both transmitter-initiated and receiver-initiated power-saving handshaking modes may be available, and the memory may also store information for choosing between these different power-saving transmission modes.

Second Embodiment

In the second embodiment, the information identifying nodes not requiring power-saving handshaking is not prestored in the memory of the transmitting node but is acquired in the course of communication. A receiving node that operates continuously sends information to the transmitting node indicating that power-saving handshaking is not required, and the transmitting node updates its memory contents according to this information.

Figure 6:
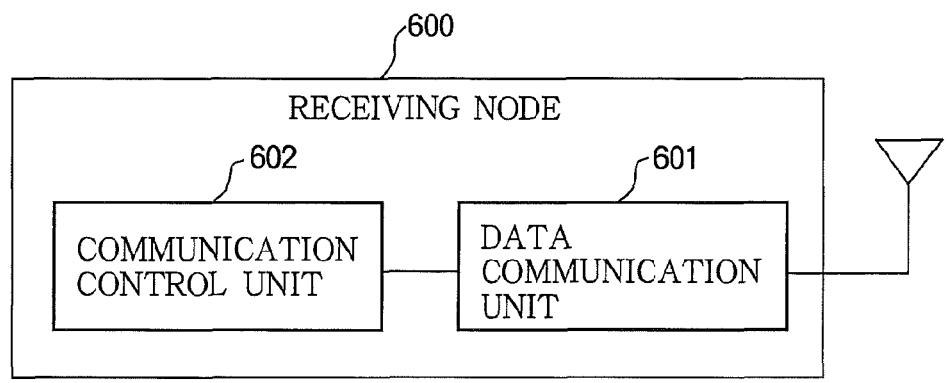
FIG. 6 a block diagram illustrating a receiving node in a second embodiment of the invention.

The node in the block diagram in FIG. 6 is a non-power-saving receiving node 600 that communicates with the transmitting node 400 described in the first embodiment. The receiving node 600 comprises a data communication unit 601 and a communication control unit 602.

The data communication unit 601 performs information communication functions under the control of the communication control unit 602, to which the data communication unit 601 is connected.

The communication control unit 602, controls data receiving operations and causes the data communication unit 601 to transmit information to surrounding nodes indicating that that no power-saving handshaking is necessary for transmission to the receiving node 600.

Figure 7:
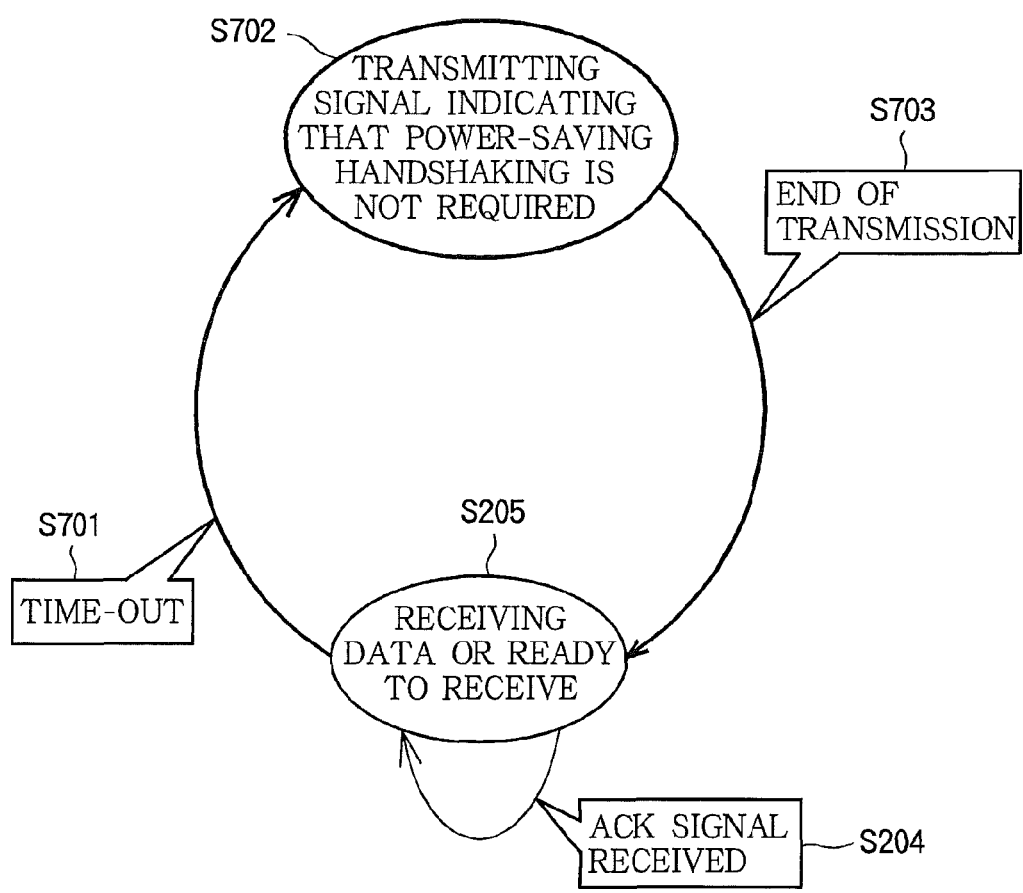
FIG. 7 is a state transition diagram of the receiving node in FIG. 6.

The operation of the second embodiment will be described with reference to FIG. 7, which illustrates state transitions of the receiving node in FIG. 6. The description will focus on the differences from the conventional operation illustrated FIG. 2.

The receiving node 600 operates continuously; it does not periodically enter a sleep mode. Normally, the receiving node 600 is in the data-receiving state (S205), which now includes the ready-to-receive state. If the receiving node 600 receives an acknowledging (ACK) signal (S204), it simply remains in the data-receiving state (S205).

At regular intervals, however, a timer in the receiving node times out and the receiving node makes a transition (S701) to a transmitting state (S702) in which the communication control unit 602 causes the data communication unit 601 to transmit a signal to the surrounding nodes informing them that the receiving node 600 does not require power-saving handshaking. A multi-address transmission mode is employed. After transmitting this signal, the receiving node 600 makes a transition (S703) back to the data-receiving state (S205).

In other words, at predetermined intervals, the receiving node 600 announces its presence to surrounding nodes and presents itself as a non-power-saving node.

The signal transmitted in state S702 preferably has the same format as the ready-to-receive signal S301 transmitted by a power-saving node in FIG. 3.

Alternatively, information indicating whether power-saving handshaking is necessary or not may be added to the ready-to-receive signal S301.

If the receiving node 600 transmits a beacon signal at regular intervals, the information indicating whether power-saving handshaking is necessary may be placed in the beacon signal.

When the transmitting node 400 described in the first embodiment receives the signal transmitted by the receiving node 600 in state S702, the communication control unit 402 stores information indicating that the receiving node 600 is a non-power-saving node in the memory 403. Thereafter, in transmitting data to receiving node 600, transmitting node 400 will make the transition S502 directly from the decision state S501 to the data transmitting state S107 as described in the first embodiment, omitting the power-saving handshaking procedure.

The second embodiment operates in the same way as the first embodiment, except that receiving node 600 periodically transmits information that it does not require power-saving handshaking, and the communication control unit 402 in the transmitting node 400 stores this information in its memory 403. The second embodiment therefore provides the same advantages as in the first embodiment, with the further advantage of easier system set-up and maintenance, because when a new node joins the system, the information in its memory and the memories of other nodes does not have to be updated by the user.

Like the first embodiment, the second embodiment is applicable to systems that employ any type of power-saving handshaking protocol, including but not limited to the RICER and TICER protocols described in the prior art.

The intervals at which non-power-saving receiving node 600 transmits the information signal or ready-to-receive signal indicating that it is a non-power-saving node are preferably longer than the intervals at which the ready-to-receive signal is transmitted by a power-saving receiving node. That is, the time-out interval causing transition S701 in FIG. 6 is preferably longer than the time-out interval causing transition S202 in FIG. 2. This signal is transmitted for the benefit of new nodes that have recently joined the network, so the signal does not have to be transmitted frequently.

Although separate transmitting and receiving nodes were described in the first and second embodiments, the same node may have both transmitting and receiving functions. If the node is a power-saving node, its communication control unit may implement the procedures shown in both FIGS. 2 and 5. If the node is a non-power-saving node, its communication control unit may implement the procedures shown in both FIGS. 5 and 7. The advantages described in both the first and second embodiments are obtained.

Figure 8:
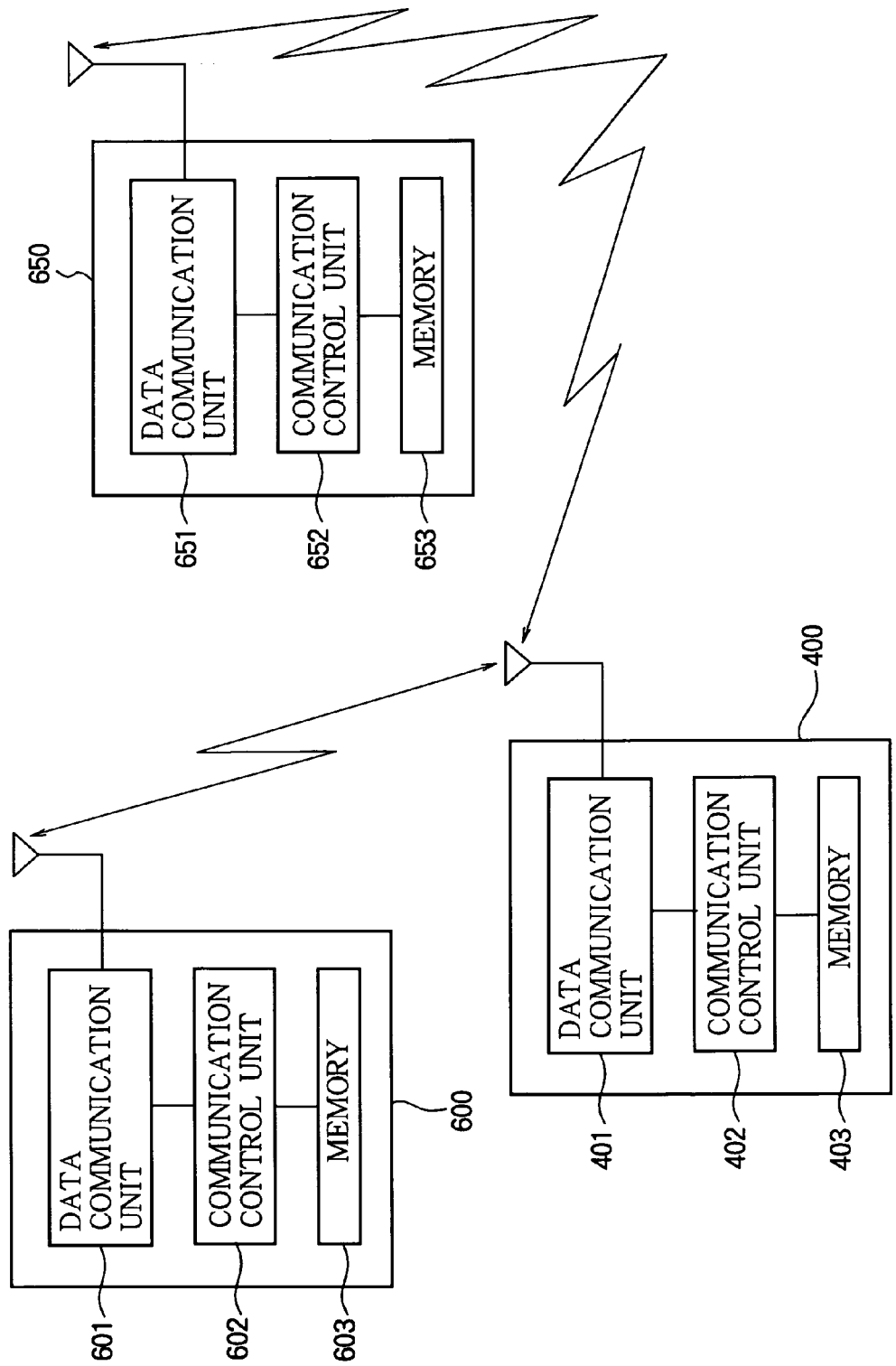
FIG. 8 is a block diagram illustrating an information transmitting system with multiple nodes.

FIG. 8 shows an exemplary information transmission including three nodes 400, 600, 650, each having both transmitting and receiving functions. The first node 600 operates continuously; the second node 650 and third node 400 operate intermittently. The communication control unit 601 in the first node 600 controls transmission as illustrated in FIG. 5, using data communication unit 601 and memory 603, and controls reception as illustrated in FIG. 7. The communication control unit 651 in the second node 650 controls transmission as illustrated in FIG. 5, using data communication unit 651 and memory 653, and controls reception as illustrated in FIG. 2, for example. The communication control unit 401 in the third node 400 controls transmission as illustrated in FIG. 5, using data communication unit 401 and memory 403, and controls reception as illustrated in FIG. 2. Alternatively, the third node 400 may operate continuously and its communication control unit 402 may control transmission as illustrated in FIG. 5 and reception as illustrated in FIG. 7.

Those skilled in the art will recognize that further variations are possible within the scope of the invention, which is defined in the appended claims.

What is claimed is:

1. An information transmitting device for transmitting first information to one or more destination devices, the information transmitting device comprising:

a memory for storing second information indicating whether or not each destination device requires power-saving handshaking in order to receive the first information;

a control unit for selecting at least a power-saving transmission mode and a normal transmission mode according to the second information stored in the memory, the power-saving transmission mode including transmitting and receiving of power-saving handshaking signals, the normal transmission mode excluding the transmitting and the receiving of the power-saving handshaking signals; and a communication unit for transmitting the first information in the mode selected by the control unit, wherein the control unit has the communication unit transmit third information indicating whether or not the information transmitting device itself requires the power-saving handshaking in order to receive incoming transmissions of fourth information.

2. The information transmitting device of claim 1, wherein when the information transmitting device is ready to transmit the first information to one of the one or more destination devices:

in the power-saving transmission mode, before allowing the communication unit to transmit the first information, the control unit waits to receive a predetermined signal from the one of the one or more destination devices; and in the normal transmission mode, the control unit has the communication unit transmit the first information immediately, without waiting to receive the predetermined signal.

3. The information transmitting device of claim 1, wherein the communication unit receives the second information indicating whether or not each destination device requires power-saving handshaking from said each destination device and the control unit stores the received second information in the memory.

4. The information transmitting device of claim 1, wherein the control unit has the communication unit transmit, at periodic intervals, a signal including the third information and indicating that the information transmitting device is ready to receive the fourth information.

5. The information transmitting device of claim 4, wherein the periodic intervals are longer when the third information indicates that the information transmitting device does not require the power-saving handshaking than when the third information indicates that the information transmitting device requires the power-saving handshaking.

6. The information transmitting device of claim 1, wherein if the information transmitting device operates continuously, the third information indicates that the information transmitting device does not require the power-saving handshaking.

7. An information transmitting system comprising a plurality of nodes, the plurality of nodes including at least a first node that operates continuously, a second node that operates intermittently, and a third node that transmits at least first information to the first node and second information to the second node, wherein:

the first node is operable to receive the first information without power-saving handshaking and includes
a first control unit, and
a first communication unit controlled by the first control unit to receive the first information from the third node and transmit third information to the third node, the third information indicating that the second first node does not require the power-saving handshaking;

the second node is operable to receive the second information with the power-saving handshaking and includes
a second control unit, and
a second communication unit controlled by the second control unit to receive the second information from the third node; and the third node includes
a memory for storing information identifying nodes requiring the power-saving handshaking,
a third control unit for storing the third information in the memory, and
a third communication unit controlled by the third control unit according to the third information stored in the memory to transmit the second information preceded by power-saving handshaking signals to the second node and to transmit the first information without the power-saving handshaking signals to the first node, wherein the first control unit has the first communication unit transmit the third information at first periodic intervals and the second control unit has the second communication unit transmit the ready-to-receive signal at second periodic intervals, and
the first periodic intervals are longer than the second periodic intervals.

8. The information transmitting system of claim 7, wherein the power-saving handshaking signals include a ready-to-receive signal transmitted from the second node to the third node to indicate that the second node is ready to receive the second information and an acknowledging signal transmitted from the third node to the second node to indicate that the ready-to-receive signal has been received and that the third node is about to transmit the second information.

9. A method of transmitting first information from an information transmitting device to a destination device, comprising:

obtaining second information indicating whether or not the destination device requires power-saving handshaking;
storing the second information in a memory in the information transmitting device;
selecting at least a power-saving transmission mode and a normal transmission mode according to the second information stored in the memory, the power-saving transmission mode including transmitting and receiving of power-saving handshaking signals, the normal transmission mode excluding the transmitting and the receiving of the power-saving handshaking signals; and
transmitting the first information in the selected mode,
wherein transmitting the first information in the power-saving transmission mode comprises:
waiting to receive a predetermined signal;
transmitting an acknowledging signal after receiving the predetermined signal; and
transmitting the first information after transmitting the acknowledging signal, and
the second information is included in the predetermined signal.

10. The method of claim 9, wherein transmitting the first information in the normal transmission mode comprises transmitting the first information without waiting to receive the predetermined signal and without transmitting the acknowledging signal.

11. The method of claim 9, wherein if the destination device requires the power-saving handshaking the destination device transmits the predetermined signal at first periodic intervals.

12. The method of claim 11, wherein if the destination device does not require the power-saving handshaking the destination device transmits the predetermined signal at second periodic intervals, the second periodic intervals being longer than the first periodic intervals.

13. The method of claim 12, wherein:
if the destination device operates continuously, the predetermined signal transmitted by the destination device indicates that the power-saving handshaking is not required; and
if the destination device operates intermittently, the predetermined signal transmitted by the destination device indicates that the power-saving handshaking is required.

14. The information transmitting device of claim 1, wherein if the destination device operates continuously, the second information indicates that the destination device does not require the power-saving handshaking.

* * * * *